United States Patent [19]

Wood et al.

[11] 4,146,047
[45] Mar. 27, 1979

[54] INTEGRAL FLUID PRESSURE RUPTURABLE APPARATUS

[75] Inventors: Loren E. Wood; Edward H. Short, III, both of Tulsa, Okla.

[73] Assignee: Black, Sivals & Bryson, Inc., Houston, Tex.

[21] Appl. No.: 762,867

[22] Filed: Jan. 27, 1977

Related U.S. Application Data

[63] Continuation-in-part of Ser. No. 612,652, Sep. 12, 1975, abandoned.

[51] Int. Cl.² ............................................. F16K 17/40
[52] U.S. Cl. .............................. 137/68 R; 113/116 B; 220/89 A
[58] Field of Search ................... 137/68 R, 69, 71; 220/89 A; 72/56; 113/116 B

[56] References Cited

U.S. PATENT DOCUMENTS

| 2,553,267 | 5/1951 | Nedoh | 220/89 A |
| 2,608,201 | 8/1952 | Henry | 137/68 R |
| 3,443,721 | 5/1969 | Le Jeune | 220/89 A |
| 3,815,779 | 6/1974 | Ludwig et al. | 220/89 A |

FOREIGN PATENT DOCUMENTS

| 250748 | 11/1966 | Austria | 220/89 A |
| 157011 | 11/1956 | Sweden | 113/116 B |

Primary Examiner—Martin P. Schwadron
Assistant Examiner—Richard Gerard
Attorney, Agent, or Firm—C. Clark Dougherty, Jr.

[57] ABSTRACT

An integral reverse buckling fluid pressure rupturable apparatus comprised of a support body formed of a ductile material having opposite ends and having a recess extending inwardly from one of the opposite ends, the internal terminus of the recess being positioned in close proximity to the other of the opposite ends of the body or to the terminus of another recess extending inwardly from the other of the opposite ends, whereby a relatively thin integral rupturable portion is formed in the body. The rupturable portion is of a concave-convex shape formed by applying pressure on a side of the rupturable portion when in a substantially flat state.

2 Claims, 11 Drawing Figures

INTEGRAL FLUID PRESSURE RUPTURABLE APPARATUS

CROSS REFERENCE TO RELATED APPLICATION

This application is a continuation-in-part of U.S. patent application Ser. No. 612,652 filed Sept. 12, 1975, now abandoned.

BACKGROUND OF THE INVENTION

1. Field of the Invention

This invention relates to an integral fluid pressure rupturable apparatus, and more particularly, to an integral reverse buckling safety pressure relief apparatus.

2. Description of the Prior Art

Many various safety pressure relief devices of the rupture disk type have been developed. Generally, these devices include a rupture disk supported between a pair of supporting members or flanges which are in turn connected to a relief connection in a vessel or system containing fluid pressure. When the fluid pressure within the vessel or system exceeds the design rupture pressure of the disk, rupture occurs causing fluid pressure to be relieved from the vessel or system. Generally, such heretofore developed and used rupture disk assemblies have been welded, soldered, bolted or otherwise clamped together, and the rupture disks have generally been formed of a thin frangible metal or other material having a concave-convex shape.

For many years after the initial development of safety pressure relief devices of the rupture disk type, and often presently, the concave-convex rupture disk is placed in the pressure relief assembly so that fluid pressure from the vessel or system to be protected is exerted against the concave side of the disk. This arrangement places the disk in tension and in order to prevent premature stress failures in the disk, the operating fluid pressure exerted on the disk, i.e., the normal operation pressure of the vessel or system, must be considerably less than the pressure at which the disk is designed to rupture.

In more recent years, rupture disk assemblies of the so-called "reverse buckling" type have been developed which are capable of operating at 90 percent or more of the pressure at which the disk is designed to rupture. Such assemblies include various parts which are welded, soldered, bolted or otherwise clamped together and include a concave-convex rupture disk positioned in the assembly so that fluid pressure from the system or vessel to be protected is exerted on the convex side of the disk. This results in the disk being placed in compression during operation and allows the normal fluid pressure exerted on the disk to be relatively close to the pressure at which the disk is designed to rupture. Further, reverse buckling rupture disks can withstand pressure fluctuations within the vessel or system over a long period of time without premature failure. Such reverse buckling rupture disk assemblies have heretofore included knife blades upon which the disk impales when reversed by excess fluid pressure, or scores or grooves on a surface of the concave-convex portion of the disk creating lines of weakness therein so that upon reversal, the concave-convex portion tears along the lines of weakness and opens.

In substantially all of the various safety pressure relief devices developed and used heretofore, various parts are assembled and clamped together. In reverse buckling rupture disk assemblies, the rupture disk is often clamped between a pair of special annular members which are in turn clamped between inlet and outlet flanges. Regardless of the particular techniques used for clamping the rupture disk between supporting members, the pressure at which the disk ruptures is often affected and can be changed appreciably by variables in the holding or clamping means. For example, the rupture pressures of reverse buckling rupture disk assemblies which are welded or soldered together are affected by variations in the welding or soldering heat, the speed at which the welding or soldering is accomplished, the force exerted on the rupture disk by the supporting members, etc. The rupture pressure of reverse buckling rupture disks clamped in bolted assemblies are affected and often substantially changed by variations in the flange configuration, the bolting load exerted on the rupture disk, misalignment of the rupture disk within the supporting members, etc. Further, because heretofore used reverse buckling rupture disk assemblies include various parts which are clamped together, the utilization of such devices in high pressure applications has been limited, i.e., to applications wherein the fluid pressure exerted on the rupture disk are below about 2,000 psig. This limitation has generally been due to the fact that a reverse buckling rupture disk designed for a high pressure application must include a relatively thick concave-convex portion connected to an annular flange portion by a transition connection having a large radius. When high pressures are exerted on the disk, unpredictable failure often occurs at the large radius transition connection in that the diameter of the concave-convex portion is reduced as the pressure forces exerted thereon cause the radius portion to roll inward until the disk fails by rolling off the supporting member.

By the present invention, an integral reverse buckling fluid pressure rupturable apparatus is provided which includes only a single part thereby eliminating the problems mentioned above. Further, the apparatus of the present invention is particularly suitable in high pressure applications in that the rupturable portion of the apparatus does not include a large radius transition connection and consequently the heretofore experienced problems of unpredictable failure are obviated.

SUMMARY OF THE INVENTION

An integral reverse buckling fluid pressure rupturable apparatus comprised of a body formed of a ductile material having opposite ends, having a recess extending inwardly from one of the opposite ends, the internal terminus of the recess being positioned in close proximity to the other of the opposite ends of the body whereby a relatively thin integral rupturable portion is formed in the body. The rupturable portion of the body is of a concave-convex shape formed by applying pressure on a side of the rupturable portion when in a substantially flat state.

It is, therefore, a general object of the present invention to provide an integral pressure formed reverse buckling fluid pressure rupturable apparatus of one-piece integral construction whereby the requirement of clamping several parts together to form the apparatus is eliminated.

Yet a further object of the present invention is the provision of an integral reverse buckling fluid pressure rupturable apparatus which is capable of achieving long service life in extremely high pressure applications at operating pressures up to 90 percent of the pressure at which the apparatus is designed to rupture.

Another object of the present invention is the provision of an integral reverse buckling fluid pressure rupturable apparatus which is economical to produce in lots or groups with little variation in the rupture pressure between individual apparatus in the group.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
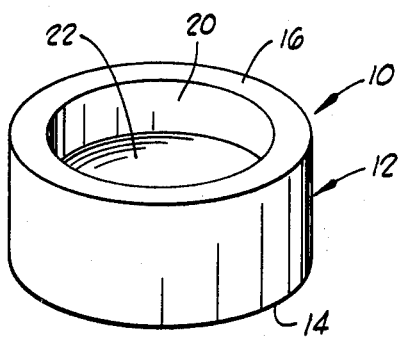
FIG. 1 is a perspective view of one form of an integral reverse buckling fluid pressure rupturable apparatus of the present invention.
Figure 2:
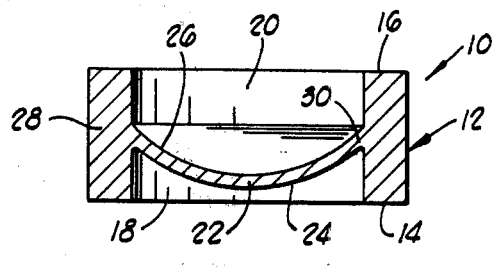
FIG. 2 is a cross-sectional view of the apparatus of FIG. 1.
Figure 3:
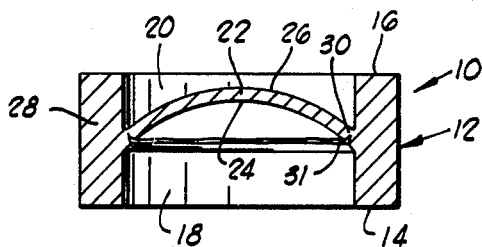
FIG. 3 is a cross-sectional view similar to FIG. 2 showing the apparatus after reversal of the rupturable portion thereof.
Figure 4:
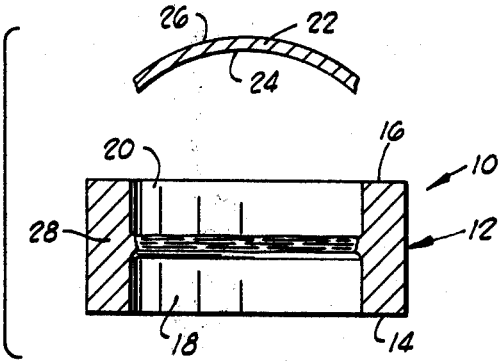
FIG. 4 is a cross-sectional view similar to FIG. 2 showing the apparatus after reversal and rupture of the rupturable portion thereof.

Referring now to the drawings, and particularly to FIGS. 1 through 4, one presently preferred form of the apparatus of the present invention is illustrated and generally designated by the numeral 10. The apparatus 10 basically comprises a cylindrical support body 12 formed of a ductile material having opposite parallel ends 14 and 16. As best shown in FIGS. 2 – 4, an inlet cylindrical recess 18 is provided in the body 12 extending from the end 14 thereof inwardly and terminating within the body 12. An outlet cylindrical recess 20 is provided in the support body 12 extending inwardly from the end 16 thereof and terminating in close proximity to the terminus of the recess 18 whereby a relatively thin integral rupturable portion 22 is formed within the body 12. The rupturable portion 22 is formed into a concave-convex shape with the convex side 24 thereof facing the inlet recess 18 and the concave side 26 thereof facing the outlet recess 20. The cylindrical body 12 and the cylindrical inlet and outlet recesses 18 and 20 therein are positioned coaxially so that the rupturable portion 22 of the body 12 is connected to the remaining outer annular portion 28 of the body 12 by an annular connection 30 lying in a plane perpendicular to the axis of the body 12.

Figure 5:
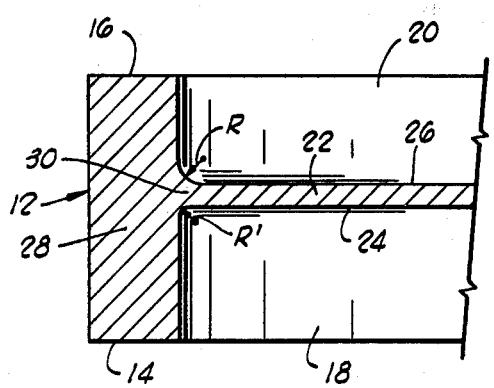
FIG. 5 is an enlarged partial cross-sectional view of the apparatus of FIG. 1 prior to forming the rupturable portion thereof into a concave-convex shape.

The rupturable portion 22 of the body 12 is formed into its concave-convex shape by first machining the rupturable portion 22 in a flat configuration as shown in FIG. 5. Pressure is then applied to the rupturable portion 22 by way of the outlet recess 20 so that the rupturable portion 22 is stretched or bulged into the desired concave-convex shape. While the stretching or bulging of the rupturable portion 22 can be accomplished mechanically, i.e., forcing a plug having a convex surface against the rupturable portion 22 by way of the outlet recess 20 until the rupturable portion 22 is deformed into a concave-convex shape corresponding with the convex shape of the plug, the bulging of the rupturable portion 22 is preferably accomplished by exerting fluid pressure on the side 26 thereof by way of the outlet recess 20. In either technique, in order to insure that the connection 30 of the rupturable portion 22 to the outer annular portion 28 of the body 12 is of proper strength, i.e., resists tearing or cracking when the rupturable portion 22 is formed into the concave-convex shape, the recesses 18 and 20 are machined or otherwise formed in the body 12 whereby the connection 30 includes smoothly curved portions on both sides of the rupturable portion 22 and the rupturable portion 22 is substantially flat. The curved portion of the connection 30 on the side 26 of the rupturable portion 22 corresponds with an arc of a circle having a radius R. The curved portion of the connection 30 within the inlet recess 18 corresponds with an arc of a circle having a radius R'.

Figure 6:
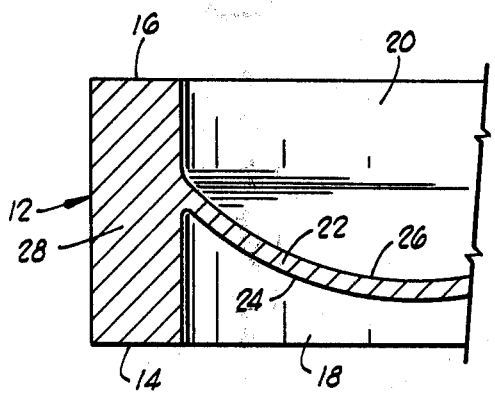
FIG. 6 is an enlarged partial cross-sectional view of the apparatus of FIG. 1 after forming the rupturable portion thereof into a concave-convex shape.

As will be understood, the thickness of the rupturable portion 22 of the apparatus 10, the material from which the apparatus 10 is formed, e.g., stainless steel, carbon steel, inconel, etc., and the fluid pressure utilized to form the rupturable portion 22 into a concave-convex shape as well as the diameter of the rupturable portion 22 determine the fluid pressure level at which the rupturable portion 22 of the apparatus 10 will reverse and rupture. These variables are adjusted in the manufacture of the apparatus 10 to produce an apparatus having the desired reverse buckling rupture pressure. In addition, however, it is necessary that the radii R and R' of the curved portions of the connection 30 be of specific size to avoid cracking or other stress failure of the connection 30 when the rupturable portion 22 is formed from a substantially flat state to the concave-convex shape, and to insure that the rupturable portion 22 tears away from the outer annular portion 28 of the body 12 after reversal. The most critical of the radiuses R and R' is the radius R within the outlet recess 20 of the body 12. That is, the radius R must be large enough so that when the rupturable portion 22 is formed into the concave-convex shape, the connection 30 does not become weakened due to the stretching of the material from which the body 12 is formed at the curved portion of the connection 30 within the outlet recess 20. Preferably, the radius R is of a length equal to or greater than one half of the thickness of the rupturable portion 22 prior to forming so that upon forming the connection 30 includes a smooth unbroken transition on the side thereof facing the outlet recess 20 as illustrated in FIG. 6. The radius R' must be small as compared to the radius R so that upon reversal of the rupturable portion 22, the stress created in the connection 30 at the radius R' causes the connection to shear and the rupturable portion 22 to tear away from the portion 28 of the body 12.

Preferably the radius R' is as small as the machining process used in forming the inlet recess 18 will allow.

In operation of the apparatus 10, the apparatus 10 is sealingly positioned in a pressure relief area with the fluid pressure from the vessel or system being protected exerted on the convex side 24 of the rupturable portion 22. In the form illustrated in FIGS. 1 – 6, the apparatus 10 can be conveniently clamped between conventional pipe flanges or other similar clamping means. When the fluid pressure exerted on the convex side 24 of the rupturable portion 22 exceeds the design rupture pressure of the apparatus 10, the rupturable portion 22 reverses itself as shown in FIG. 3 which causes the stress failure of the connection 30, i.e., the formation of cracks 31 in the connection 30 on the side thereof facing the inlet recess 18. As a result of the cracking and stress failure produced in the connection 30 upon reversal of the rupturable portion 22, the entire rupturable portion 22 tears away from the outer annular portion 28 of the body 12 at the connection 30 as illustrated in FIG. 4 thereby providing a full opening through the body 12 and full relief of fluid pressure from the system or vessel being protected.

Figure 7:
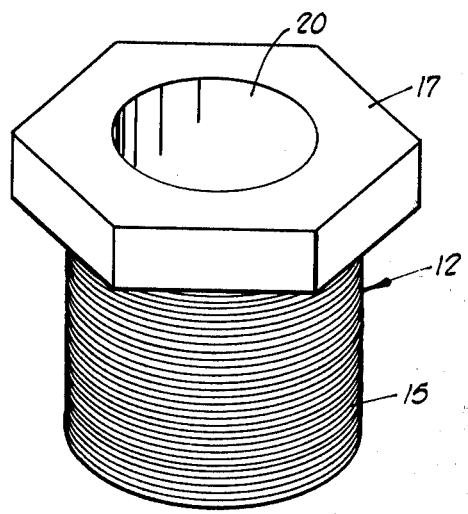
FIG. 7 is a perspective view of an alternate form of the apparatus of the present invention.
Figure 8:
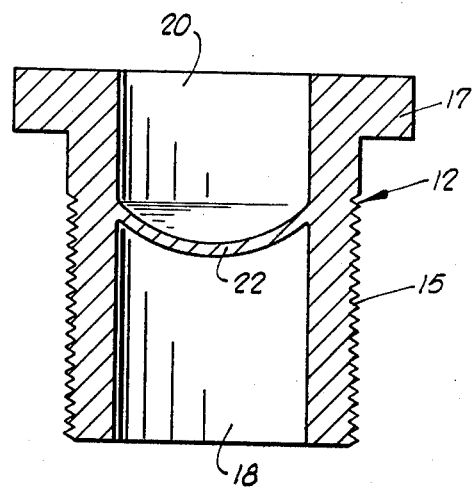
FIG. 8 is a cross-sectional view of the apparatus of FIG. 7.

As will be readily understood by those skilled in the art, the configuration of the body 12 can take a variety of forms. For example, the body 12 can be cylindrical as illustrated in FIGS. 1 – 6 so that it can be readily clamped between conventional pipe flanges, etc., or as illustrated in FIGS. 7 and 8, the body 12 can be formed in a manner such that it is adapted to be directly connected to a system or vessel containing fluid pressure. That is, the body 12 can include threads 15 on the lower outside surfaces thereof for direct threaded connection to a pipe fitting, and the upper outer portion 17 can be formed into a hex head for facilitating the threading of the body 12 into the pipe fitting. Further, threads can be provided on the outside surfaces of the body 12 at either end and/or within either or both of the recesses 18 and 20.

Figure 9:
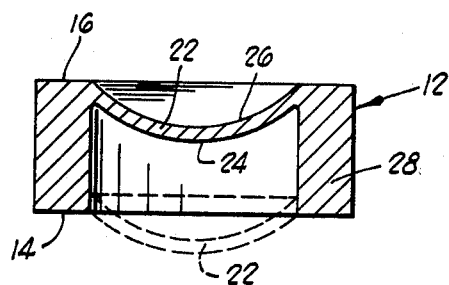
FIG. 9 is a cross-sectional view of apparatus similar to that illustrated in FIGS. 1 and 2, showing alternate arrangements of the rupturable portion thereof.
Figure 10:
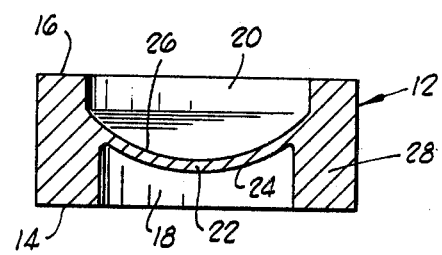
FIG. 10 is a cross-sectional view similar to FIG. 9 showing another alternate arrangement.
Figure 11:
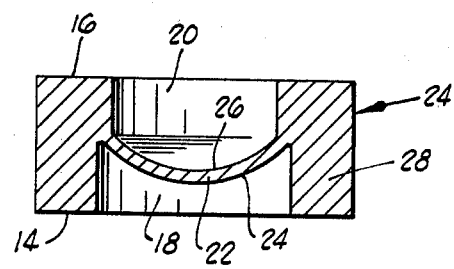
FIG. 11 is a cross-sectional view similar to FIG. 10 showing yet another alternate arrangement.

Further, the position of the rupturable portion 22 within the body 12 can vary as can the diameters of the recesses 18 and 20 to produce different desired results. For example, as illustrated in FIG. 9 the apparatus 10 can be formed with a single recess 18 or 20 whereby the rupturable portion 22 is positioned at either end of the support body 12, or as illustrated in FIGS. 10 and 11, the inlet and outlet cylindrical recesses 18 and 20 can be of different diameters. In FIG. 10, the outlet recess 20 is of a larger diameter than the inlet recess 18, and in FIG. 11 the outlet recess 20 is of a smaller diameter than the inlet recess 18.

The forming of the rupturable portion 22 of the body 12 into a concave-convex shape by applying pressure thereto when in the flat state by way of the outlet recess 20 is particularly well suited for producing quantities of substantially identical apparatus 10. That is, when the rupturable portions 22 of apparatus 10 of substantially the same size are formed into concave-convex shapes using the same forming pressure, slight variations in the thickness of the rupturable portions do not materially affect the pressure level at which the units will rupture. That is, the rupturable portions 22 of units which are slightly thinner than others are formed into concave-convex shapes having greater apex heights which increases the fluid pressure at which the rupturable portions reverse, but those units having thicker rupturable portions are formed into concave-convex shapes of less apex height which reduces the fluid pressure at which the rupturable portions reverse thereby tending to nullify changes in reversal pressure due to slight variations in the thickness of the rupturable portions 22 of different apparatus 10. Further, because the diameter to thickness ratios of the rupturable portions 22 can be closely controlled, the apparatus 10 can be utilized in extremely high pressure applications and can withstand operating pressures at up to 90 percent of the design rupture pressure without premature failure of the rupturable portions 22.

Thus, the present invention is well adapted to carry out the objects and attain the ends and advantages mentioned as well as those inherent therein. While presently preferred methods of manufacturing the apparatus and particular embodiments thereof have been described for purposes of this disclosure, many variations will suggest themselves to those skilled in the art which are encompassed within the spirit of this invention as defined by the appended claims.

What is claimed is:

1. An integral reverse buckling fluid pressure rupturable apparatus comprised of:
   a body formed of a ductile material having opposite ends, having a cylindrical inlet recess extending inwardly from one of said opposite ends and a cylindrical outlet recess positioned coaxially with said inlet recess and said body extending inwardly from the other of said opposite ends, the internal termini of said inlet and outlet recesses being positioned in close proximity to each other whereby a relatively thin integral rupturable portion is formed in a concave-convex shape within said body with the convex side thereof facing said inlet recess, the concave-convex rupturable portion being connected to the remaining outer portion of said body by an annular connection lying in a plane substantially perpendicular to the axis of said body and being formed in said concave-convex shape by applying pressure on a side of said rupturable portion when in a substantially flat state by way of said outlet recess;
   said annular connection, prior to forming said rupturable portion into said concave-convex shape and when said rupturable portion is in said flat sate, including smoothly curved portions on opposite sides thereof connecting said rupturable portion of said body to said outer annular portion of said body, said curved portion within said outlet recess corresponding to an arc of a circle having a radius equal to or greater than one-half of the thickness of said rupturable portion of said body.

2. An integral reverse buckling fluid pressure rupturable apparatus comprising:
   a support body formed of ductile material having opposite ends;
   a first cylindrical recess extending inwardly from one of said opposite ends of said body forming a fluid pressure inlet therein, the terminus of said first recess being positioned transversely to the axis of said body and being convex in shape;
   a second cylindrical recess extending coaxially inwardly from the other of said opposite ends of said body forming a fluid pressure outlet therein, the terminus of said second recess being positioned transversely to the axis of said body, being concave in shape and lying in close proximity to the terminus of said first recess whereby a relatively thin concave-convex fluid pressure rupturable portion is positioned interiorly of said body;

said concave-convex rupturable portion of said body being formed in said concave-convex shape by applying fluid pressure on a side of said rupturable portion when in a substantially flat state by way of said outlet recess and being connected to the remaining annular outer portion of said body by an annular connection lying in the plane substantially perpendicular to the axis of said body; said annular connection, prior to forming said rupturable portion into said concave-convex shape and when said rupturable portion is in said flat state, including smoothly curved portions on opposite sides thereof connecting said rupturable portion of said body to said outer annular portion of said body, said curved portion within said outlet recess corresponding to an arc of a circle having a radius equal to or greater than one-half the thickness of said rupturable portion of said body.

* * * * *